(12) United States Patent
Liu

(10) Patent No.: US 8,282,522 B2
(45) Date of Patent: Oct. 9, 2012

(54) MECHANICAL-HYDRAULIC CONTINUOUSLY VARIABLE TRANSMISSION, THE METHOD AND VEHICLE MECHANICAL-HYDRAULIC CONTINUOUSLY VARIABLE TRANSMISSION

(76) Inventor: Haiping Liu, Shenzhen (CN)

( * ) Notice: Subject to any disclaimer, the term of this patent is extended or adjusted under 35 U.S.C. 154(b) by 244 days.

(21) Appl. No.: 12/756,198

(22) Filed: Apr. 8, 2010

(65) Prior Publication Data

US 2010/0190599 A1   Jul. 29, 2010

Related U.S. Application Data

(63) Continuation-in-part of application No. PCT/CN2008/072356, filed on Sep. 12, 2008.

(30) Foreign Application Priority Data

Oct. 8, 2007   (CN) .......................... 2007 1 0123802

(51) Int. Cl.
   *F16H 47/08*   (2006.01)
(52) U.S. Cl. ........................................ 475/52
(58) Field of Classification Search ................ None
   See application file for complete search history.

(56) References Cited

OTHER PUBLICATIONS

Wright full record for appl 2005CN-10036495 Aug. 2005.*
CN 1880802 English translation Dec. 2006.*
CN 2900345 English translation May 2007.*
CN 10036495 English translation Aug. 2005.*
CN 100406777 English translation Jul. 2008.*
CN 1844690 English translation Oct. 2006.*

* cited by examiner

*Primary Examiner* — Dirk Wright

(57) ABSTRACT

A mechanical-hydraulic continuously variable transmission and a transmission for vehicle are provided. The mechanical speed changing components of such transmission includes an eccentric mechanism (2), a pushing disc (4), a fixing disc (3), and a driving disc (5). The eccentric mechanism can adjust the eccentric amount between the pushing disc and the power input shaft based on the load of the driving disc. The hydraulic speed changing components of such transmission include a pump runner (6) and a turbine (7) fixed to the driving disc. A power output shaft is coupled to the turbine and extended out of the housing. Based on the advantage of high torque ratio of the mechanical speed changing components at low speed ratio, the turbine of the hydraulic speed changing components can be actuated and accelerated quickly. When the speed ratio reaches a certain value, the main power transmitting path is from the pump runner to the turbine of the hydraulic speed changing components. Therefore, present patent application combines the merits of the mechanical and hydraulic speed changing components and has the advantage of high transmitting efficiency in various operating conditions.

16 Claims, 7 Drawing Sheets

MECHANICAL-HYDRAULIC CONTINUOUSLY VARIABLE TRANSMISSION, THE METHOD AND VEHICLE MECHANICAL-HYDRAULIC CONTINUOUSLY VARIABLE TRANSMISSION

CROSS-REFERENCE TO RELATED APPLICATIONS

This application is a continuation-in-part (CIP) application of PCT Application No. PCT/CN2008/072356 filed on Sep. 12, 2008, which claims priority of Chinese Patent Application No. 200710123802.1 filed on Oct. 8, 2007, the entire content of which is hereby incorporated by reference.

TECHNICAL FIELD

The present patent application relates to the continuously variable speed transmission, and more specifically, relates to a mechanical-hydraulic continuously variable transmission and a method for mechanical-hydraulic continuously changing speed, and the mechanical-hydraulic continuously variable transmission used in vehicle.

BACKGROUND

The fluid torque converter has good self-adaptability and continuously changing speed and torque function. It cushions and absorbs shock to the transmission system. It does not suffer from mechanical wear, is highly reliable, and has a long service life. Thus it is widely used in the mechanical field, including automobiles and engineering and building machines.

However, the fluid torque converter is affected by the conflict between its torque changing capability and transmission efficiency. In many cases, the slow-start and the output torque can not meet the requirements. The transmission efficiency of the fluid torque converter is very low under high torque and low rotational speed, when a cooling system must be equipped to keep down the heat, making the system complex in structure, big in size and heavy in weight.

There are many types of variable speed transmission that are currently used in vehicles, such as the hand-operated speed variable transmission, the steel belt continuously variable speed transmission and the hydraulic automatic speed variable transmission. Among these, the hydraulic automatic speed variable transmissions are most frequently used. The hydraulic automatic variable speed transmission includes a fluid torque converter and a planet gearbox or a parallel-axis gearbox. The fluid torque converter can change the torque ratio within a certain range automatically and continuously. However, the factor of torque variation is not large enough and its transmission efficiency is low at low speed ratio, while the conflict exists concurrently between the torque variation capacity and the transmission efficiency. Thus the fluid torque converter used to be equipped with gearbox. However, efficiency and speed are both sacrificed during the shifts of the speed changing gearbox, and several clutch, brake and control mechanism must be added to support the shifts, making the variable speed transmission heavy in weight, complex in structure and big in size, etc.

The Sine Continuously Variable Speed Transmission is a continuously variable speed transmission with totally new mechanism. It can realize zero-start, continuously speed changing and very high start torque, and also achieve a very high torque ratio when the rotational speed ratio is low. It is highly efficient, simple in structure, small in size and light in weight. The Sine Constantly Variable Speed Transmission has been published in Chinese Patent Applications, namely, No. 200410091908.4 entitled "Oscillation type of continuously variable speed transmission", No. 200510034124.2 entitled "Rollway one direction clutch wheel and the continuously variable speed transmission of using the rollway one direction clutch wheel", No. 200510035453.9 entitled "The variable speed transmission with balance", No. 200510036495.4 entitled "Automatic continuously variable speed transmission", and No. 200620013327.3 entitled "Self-adaptable continuously variable speed transmission used in manpower vehicle and the manpower vehicle with this variable speed transmission", and some improvement schemes have been made in these patent applications. However, the Sine Constantly Variable Speed Transmission shows shortages of decreasing trend of efficiency when working at high speed ratio. Those above mentioned patent applications are hereby incorporated by reference as if set forth in their entirety.

SUMMARY

The present patent application provides a new method and a mechanical-hydraulic continuously variable speed transmission which combines the advantages of both the mechanical torque converter and the fluid torque converter to overcome the current technological problem with fluid torque converter that it often starts slowly and its output torque can not meet the requirements.

The present patent application also provides a mechanical-hydraulic continuously variable speed transmission for vehicle which combines the advantages of both the mechanical torque converter and the fluid torque converter to overcome the shortage of the fluid torque converter used in present vehicle starting slowly in many cases and the output torque can not meet the requirements.

The present patent application provides a mechanical-hydraulic continuously variable speed transmission, including mechanical variable speed components and hydraulic variable speed components arranged within a housing and installed in turn on a power input shaft.

The mechanical variable speed components includes an eccentric mechanism rotating with the power input shaft, a pushing disc installed on the eccentric mechanism rotatablely, a fixing disc arranged on one side of the pushing disc and fixed to the inner side of the housing, and a driving disc arranged on the other side of the pushing disc and installed on the power input shaft rotatablely; the eccentric mechanism adjusts the amount of eccentricity between the pushing disc and the power input shaft according to the load on the driving disc; slider components for power transmission are positioned between the fixing disc and the pushing disc, and between the pushing disc and the driving disc too.

The hydraulic variable speed components includes a pump wheel fixed on the power input shaft and a turbine fixed with the driving disc; transmission medias are filled in the space between the pump wheel and the turbine for power transmission, and a power output shaft fixed on the turbine extending out of the housing.

Optionally, the turbine arranged between the driving disc and the pump wheel, and the turbine is fixed to the driving disc through a shaft sleeve in the turbine.

Optionally, there is a guide wheel between the turbine and the pump wheel, and the guide wheel is installed on the shaft sleeve in the turbine by a single direction clutch or bearing.

Optionally, a lock-up clutch is located between the power input shaft and the turbine output shaft.

Optionally, the pushing disc is installed on the eccentric mechanism by a bearing, the shaft sleeve in the turbine is installed on the power input shaft by a bearing, and the eccentric mechanism is pushed by hydraulic power.

When the eccentricity of the eccentric mechanism is zero, the driving disc and pushing disc are concentric with the power input shaft; the eccentricity of the eccentric mechanism is produced when the load is acted on the turbine output shaft, and the eccentricity of the pushing disc and the driving disc is produced.

The present patent application also provides a power input shaft connected with the engine of the vehicle, mechanical variable speed components and hydraulic variable speed components arranged within a housing and installed in turn on the power input shaft, and gears speed shifting components driven by the hydraulic variable speed components.

Optionally, the mechanical variable speed components including an eccentric mechanism rotating with the power input shaft, a pushing disc installed on the eccentric mechanism rotatablely, a fixing disc arranged on one side of the pushing disc and fixed to the inner side of the housing, and a driving disc arranged on the other side of the pushing disc and installed on the power input shaft rotatablely; the eccentric mechanism adjusts the amount of eccentricity between the pushing disc and the power input shaft according to the load on the driving disc; slider components for power transmission are positioned between the fixing disc and the pushing disc, and between the pushing disc and the driving disc too;

Optionally, the hydraulic variable speed components including a pump wheel fixed on the power input shaft and a turbine fixed with the driving disc; transmission medias are filled in the space between the pump wheel and the turbine for power transmission, and a power output shaft fixed on the turbine extending out of the housing.

Optionally, the gears speed shifting components include a sun gear fixed with the turbine output shaft, planet gears gearing with the sun gear, an annular gear gearing with the planet gears, a planet gears carrier for the planet gears installing on, a clutch arranged on the turbine output shaft outside, as well as a brake installed inside of the housing; the clutch and the brake control the planet gears carrier, and the annular gear has a power output shaft which extending out of the housing.

Optionally, the turbine arranged between the driving disc and the pump wheel, and the turbine is fixed to the driving disc through a shaft sleeve in the turbine.

Optionally, there is a guide wheel between the turbine and the pump wheel, and the guide wheel is installed on the shaft sleeve in the turbine by a single direction clutch or bearing.

Optionally, a lock-up clutch between the power input shaft and the turbine output shaft.

Optionally, the pushing disc is installed on the eccentric mechanism by a bearing, the shaft sleeve in the turbine is installed on the power input shaft by a bearing, and the eccentric mechanism is pushed by hydraulic power.

Optionally, when the eccentricity of the eccentric mechanism is zero, the driving disc and pushing disc are concentric with the power input shaft; the eccentricity of the eccentric mechanism is produced when the load is acted on the turbine output shaft, and the eccentricity of the pushing disc and the driving disc is produced.

The present patent application also provides a method of mechanical-hydraulic continuously variable speed, including:

motive powers input by a power input shaft, and loads are driven by a turbine output shaft;

when the transmission ratio is low, a eccentric mechanism produces eccentricity which makes a pushing disc produce eccentricity; the power input shaft drives the pushing disc to rotate eccentrically, and drives a driving disc to rotate through slider components, the driving disc drives a turbine to rotate, and the turbine output shaft outputs powers; at the same time, a pump wheel of hydraulic variable speed components rotated by the power input shaft, and pushes the turbine to rotate through transmission medias, so as to take into the assistant action of pushing the turbine output shaft to output powers;

when the rotating speed of the turbine and the rotational speed ratio reach a certain value, the eccentric mechanism resets and makes the pushing disc concentric with the driving disc; at this time, the pump wheel rotates at high speed driven by the power input shaft, and also pushes the turbine to rotate at a high speed through the transmission medias, and the turbine output shaft outputs the powers;

when the transmission ratio increases continuously, until the pump wheel and the turbine are locked, the maximum transmission efficiency is obtained.

The implement of the present patent application has following profitable effect: Through adding the mechanical variable speed components at front stage of the hydraulic variable speed components, it takes the advantages of the mechanical variable speed components that the toque ratio is high when rotating at low speed ratio, which drives quickly the turbine of the hydraulic variable speed components to start, and accelerates fast rotating. When rotational speed ratio rises to a certain value, the main route of the power transmission turns into pump wheel and turbine. All of them synthesize and take the advantages of high efficiency of the mechanical variable speed components that the toque ratio is high when rotating at low speed ratio and of the hydraulic variable speed components that it works at high speed ratio. The intrinsic combination and superiority complementation of the two devices make it to work highly effective in all kind of running condition.

BRIEF DESCRIPTION OF THE DRAWINGS

Further description of the patent application through figures and embodiments are as follows.

DETAILED DESCRIPTION

Figure 1:
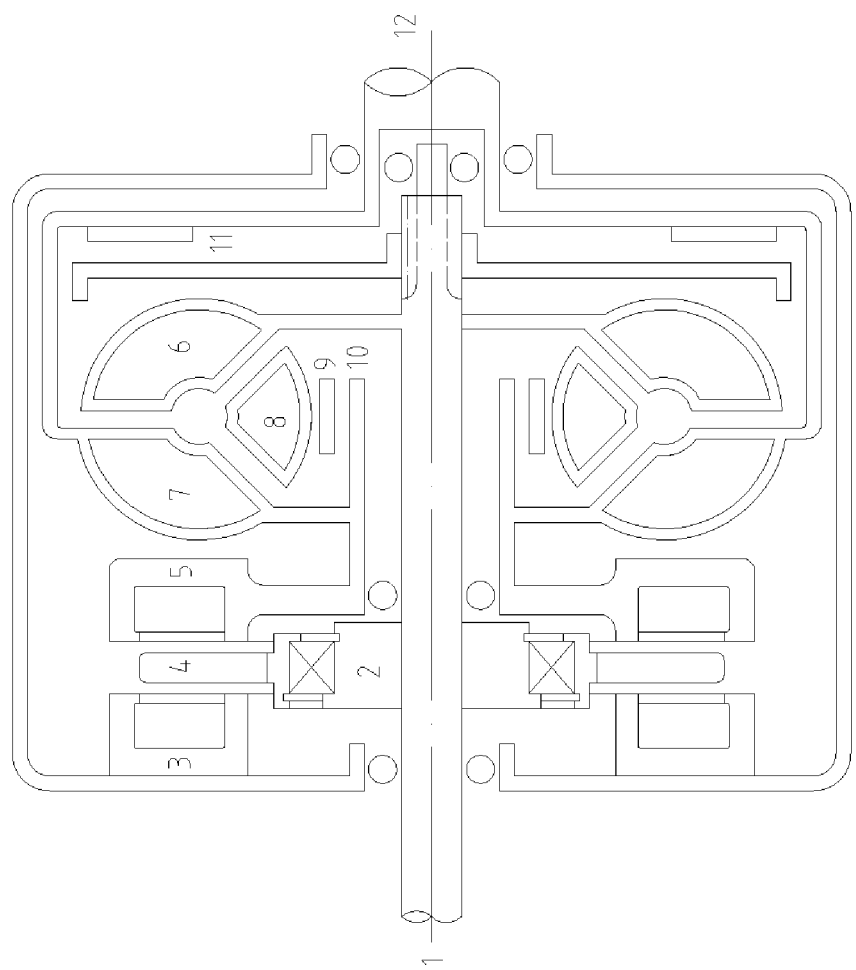
FIG. 1 is a schematic diagram of the structure of the mechanical-hydraulic continuously variable speed transmission according to the present patent application.

FIG. 1 shows an embodiment of the mechanical-hydraulic continuously variable transmission according the present patent application, including a mechanical variable speed components and a hydraulic variable speed components installed on the power input shaft 1 in sequence within a housing. The housing is used to install the entire transmission on an appropriate position. The shape and structure of the housing can be designed according to practical requirements. Bearings are used to connect the housing with the turbine output shaft 12 of the hydraulic variable speed components and power input shaft 1.

The mechanical variable speed components include an eccentric mechanism 2 which rotates with the power output shaft 1, a pushing disc 4 which is installed on the eccentric mechanism 2 through a bearing, a fixing disc 3 which is fixed inside the housing, and a driving disc 5 which is installed on the power input shaft 1 rotatablely. The fixing disc 3 and the driving disc 5 are on either side of the pushing disc 4 respectively. The pushing disc 4 and the fixing disc 3 are connected by slider components, the pushing disc 4 and the driving disc 5 are also connected by slider components, through which power is transmitted. The structure and type of the fixed disc 3, the pushing disc 4, the driving disc 5, and the slider components can be selected according to practical requirements.

Figure 2:
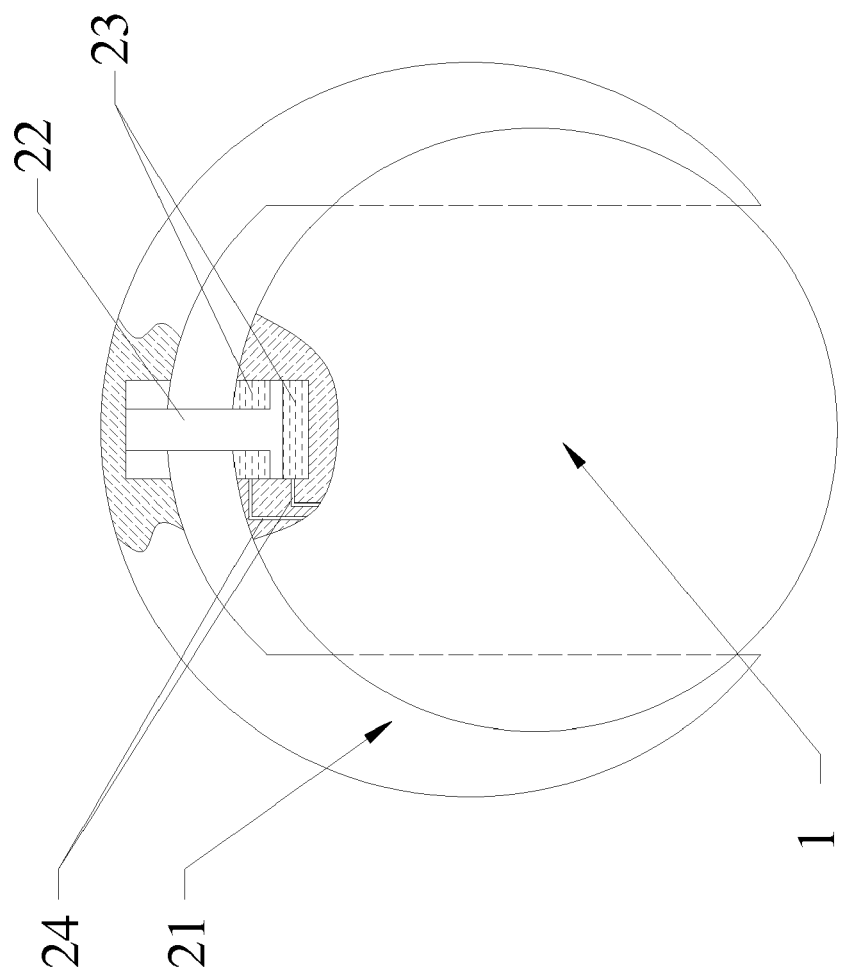
FIG. 2 is a schematic diagram of the structure of the eccentric mechanism of the mechanical-hydraulic continuously variable speed transmission according to the present patent application.

In this embodiment, as shown in FIG. 2, the eccentric mechanism 2 is pushed by hydraulic power. For example, it includes a C-shape eccentric plate 21 covered on the power input shaft 1, a piston 22 fixed on the eccentric disc 21, and a chamber 23 on the power input shaft 1. Correspondingly, slots are made on the circular surface of the power input shaft for clamping the eccentric plate 21. Therefore, the eccentric plate 21 can rotate with the power input shaft 1, and the pushing disc 4 can rotate with the power input shaft 1. The chamber 23 includes two parts, which are on either side of piston 22 respectively. An inlet setting on the power input shaft 1 is connected to the chamber 23 through a channel 24. The eccentric position of the eccentric plate 21 is adjusted by controlling the pressure difference of the two parts of the chamber 23. Thus, the eccentric position of the pushing disc 4 installed on the eccentric plate 21 can be adjusted according to actual loads. Comprehensively, the common fluids such as hydraulic oil etc. can be used, and the pressure of the fluid can be adjusted precisely by computer. Much more, other similar structures can also be used to realize the eccentric mechanism 2 to accomplish the eccentric position adjustment of the pushing disc 4.

The eccentric mechanism 2 pushes the pushing disc 4 to work between the two extreme eccentric positions: When the eccentricity is zero, the driving disc 5, the pushing disc 4 and the power input shaft 1 are in the concentric position, in which no torque transmission is produced between the pushing disc 4 and the driving disc 5, that is, the mechanical variable speed components do not work. When load acts on the driving disc 5, the eccentric mechanism 2 begins to work, pushing the pushing disc 4 to move, creating eccentric with the driving disc 5 and producing the highest transmission torque. If it keeps working, the eccentricity between the pushing disc 4 and the driving disc 5 will reach maximum. During this process, driving torque decreases gradually and transmission rotational speed ratio increases gradually, resulting in a quick start.

The hydraulic variable speed components includes a pump wheel 6 which is fixed on the power input shaft 1 and a turbine 7 which is fixed on the driving disc 5. The transmission media (transmission fluid) fills the space between the pump wheel 6 and the turbine 7. The turbine 7 has a turbine output shaft 12. In this embodiment, the turbine 7 and driving disc 5 are fixed together through a sleeve 10 within the turbine, and the turbine 7 can rotate with the driving disc 5. The integration of turbine 7 and driving disc 5 is installed on the power input shaft 1 through bearings. The other side of turbine 7 that is away from the driving disc 5 forms a sell that envelops the pump wheel 6. The end of the shell forms the turbine output shaft 12. The turbine output shaft 12 and the power input shaft 1 are connected by bearing. The pump wheel 6 fixes on and rotates with the power output shaft 1 and arranges inside the shell of turbine 7. The shell of turbine 7, the sleeve 10 in the turbine, and the bearing form a sealed chamber filled with transmission media (such as transmission fluid). The fluid pressure can be adjusted through an opening pipeline in the power input shaft 1, therefore changing the transmission speed.

In this embodiment, there is a guide wheel 8 which is arranged between the turbine 7 and the pump wheel 6. The guide wheel 8 installed on the sleeve 10 rotatablely within the turbine by one-way clutch 9 or bearing. There is a lock-up clutch 11 between the power input shaft 1 and the turbine output shaft 12. The lock-up clutch 11 includes locking pieces which can be moved along the axis and installed at the end of the power input 1 and pick-up pieces on the shell of turbine 7. When the rotational speed of turbine 7 reaches a certain value, the transmission fluid pushes the locking pieces to move and attract the pick-up pieces to pick-up, so that the power input shaft 1 directly drives turbine 7 to rotate. That is to say, the highest rotational efficiency will be obtained because the power input shaft 1 outputs the power directly through the turbine output shaft 12.

When the prime mover starting to rotate, the power input shaft 1 and the pump wheel 6 will synchronous start to rotate, but the turbine 7 under the load is in static state. When the control mechanism (such as control system of automobile) making the mechanical-hydraulic continuously variable speed transmission started to work, the transmission ratio is very small in this time; the control mechanism creates eccentricity relative to the axis of power input shaft 1 by the hydraulic pressure pushing the eccentric mechanism 2. The pushing disc 4 starts eccentric movement under the action of the eccentric mechanism 2, and drives the driving disc 5 to rotate through the slider components. The main torque is transmitted through the pushing disc 4 and along the slider to the driving disc 5. Because the torque ratio of the pushing disc 5 is very high at low rotational speed ratio (at least a number magnitude higher than the fluid torque converter), therefore, the turbine 7 which is connected rigidly with the driving disc 5 will accelerate rapidly. Since the efficiency of mechanical variable speed components is very high at low speed ratio that saves prime mover's energy, and makes the mechanical-hydraulic continuously variable speed transmission would not heat up. In this stage, the pump wheel 6 also rotates along with the power input shaft 1, and the fluid power in the pump wheel 6 also has the auxiliary function to push the turbine wheel. However, the rotation power of the turbine wheel 7 is mainly comes from driving disc 5.

Along with the rotational speed increasing of the turbine output shaft 12, the control mechanism increases eccentricity of the pushing disc 4, the torque ratio gradually decreases, and the efficiency also decreases gradually. During this time, the efficiency of the hydraulic variable speed components gradually increases. When the rotational speed of the turbine reaches to a certain level and the rotational speed ratio of the power input shaft 1 and the turbine output shaft 12 reaches to a certain value, the main power transmission route starts from the pump wheel 6 of the hydraulic variable speed components and ends at the turbine 7. At this time, the control mechanism makes the eccentric mechanism 2 on the power input shaft 1 to stop working, pushing disc 4 backs over to the zero position and no longer driving the driving disc 5 to rotate, The transmission is then completely under the working status of hydraulic variable speed components. During this time, the hydraulic variable speed components in the high efficiency area, the rotational speed of the turbine 7 rises further to the lock-up condition, and the rotation efficiency achieves 100%.

The mechanical-hydraulic continuously variable transmission possesses the advantage of high efficiency of both the Sine Continuously Variable Transmission working at the low rotational speed ratio, and the fluid torque converter working at high rotational speed ratio. Thus the combination and complementation of the two devices enables the mechanical-hydraulic continuously variable transmission to run efficiently under all kinds of operating conditions.

Figure 3:
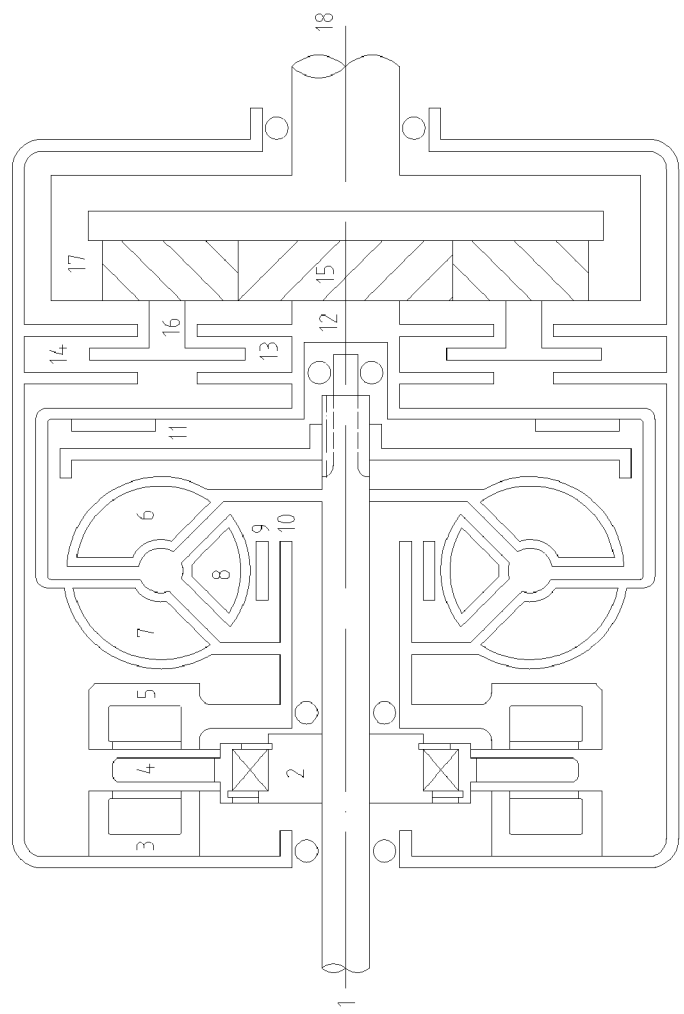
FIG. 3 is a schematic diagram of the structure of the mechanical-hydraulic continuously variable speed transmission of vehicle according to the present the patent application.

FIG. 3 illustrates an embodiment of the mechanical-hydraulic continuously variable transmission applied to vehicles (especially to automobiles). It includes the power input shaft 1 which is connected with the vehicle engine, mechanical variable speed components and hydraulic variable speed components installed inside a housing and installed on the power input shaft 1 in sequence and gears speed shifting components that is driven by the hydraulic variable speed components. The mechanical variable speed components and the hydraulic variable speed components can be the same as of the embodiment mentioned above.

The gears speed shifting components includes a sun gear 15 which is fixed with the turbine output shaft 12, planet gears gearing with sun gear 15, annular gear 17 gearing with the planet gears, planet gears carrier 16 for the planet gears being installed on, a clutch 13 which is installed on the turbine output shaft 12, as well as a brake 14 installed inside the housing. The clutch 13 and the brake 14 control the rotational relationship of the planet gears carrier 16 and the sun gear 15, so as to control the rotational movement of the annular gear 17. A power output shaft 18 of the annular gear 17 extends out of the housing. The person skill in art can consider that a conventional speed variable transmission can be applied to operate with the gears speed shifting components for increasing the rotational speed of the turbine 7, so at to satisfy the condition of in continuous low running speed of the car.

The following table presents all the gears of the vehicles, and the coordinate relationship of the clutch 13 and the brake 14.

|  | Forward gear (D) | Reverse gear (R) | Parking gear (P) | Neutral gear (N) |
| --- | --- | --- | --- | --- |
| Clutch 13 (C) | 1 | 0 | 1 | 0 |
| Brake 14 (B) | 0 | 1 | 1 | 0 |

Figure 4:
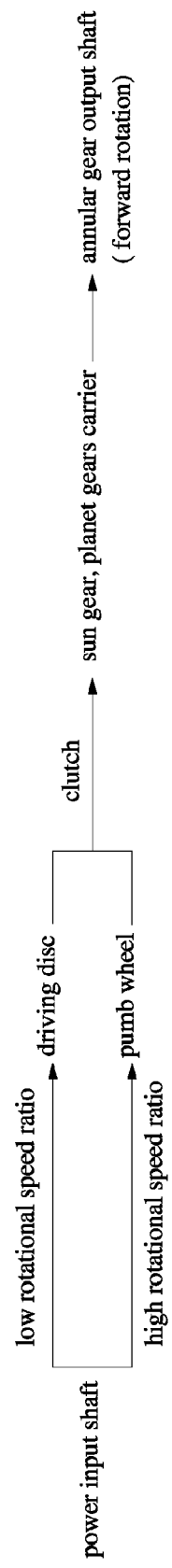
FIG. 4 is a schematic diagram of the power transmission route of the vehicle with the vehicle mechanical-hydraulic continuously variable transmission according to the present patent application when the vehicle is in forward gear D.

FIG. 4 shows the power transmission route of the vehicles in forward gear D. The power input shaft 1 drives the driving disc 5 and the pump wheel 6 to rotate through the mechanical variable speed components and the hydraulic variable speed components, as in the previous embodiment. At this time, the clutch 13 in working, the planet gears carrier 16 is connected with the sun gear, the turbine output shaft 12 drives the sun gear 15 to rotate, and the sun gear drives the planet gears on the planet gears carrier 16 to rotate, thus makes the power output shaft 18 of the annular gear to rotate in the positive direction, enabling the vehicle to move forward.

Figure 5:
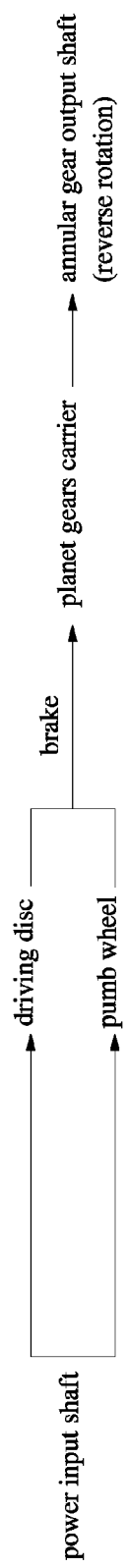
FIG. 5 is a schematic diagram of the power transmission route of the vehicle with the vehicle mechanical-hydraulic continuously variable transmission according to the present patent application when the vehicle is in reverse gear R.

FIG. 5 shows the power transmission route of the vehicles in reverse gear R. The power input shaft 1 drives the driving disc 5 and the pump wheel 6 to rotate through the mechanical variable speed components and the hydraulic variable speed components, as in the previous embodiment. At this time, the brake 14 in working, planet gears carrier 16 is connected with the housing of the transmission; the turbine output shaft 12 drives the planet gear to rotate through the sun gear, thus making power output shaft 18 of the annular gear to rotate in the opposite direction, enabling the vehicle to move reversely.

Figure 6:
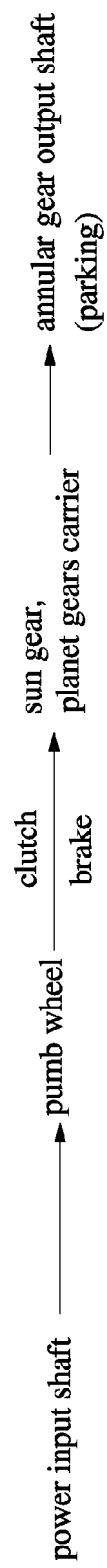
FIG. 6 is a schematic diagram of the power transmission route of the vehicle with the vehicle mechanical-hydraulic continuously variable transmission according to the present patent application when the vehicle is in parking gear P.

FIG. 6 shows the power transmission route of the vehicles in parking gear P. The mechanical variable speed components is in the stop working state under the control of the control system of the vehicle, that is, to make the pushing disc 4 concentric with the driving disc 5. Meanwhile, the power input shaft 1 drives the pump wheel 6 to rotate through the hydraulic variable speed components, as in the previous embodiment. At this time, the clutch 13 and the brake 14 in working concurrently, the sun gear 15 and the planet gears carrier 16 are fixed with the housing of the transmission, and the power output shaft of the annular gear is fixed, enabling the vehicle to park.

Figure 7:
FIG. 7 is a schematic diagram of the power transmission route of the vehicle with the vehicle mechanical-hydraulic continuously variable transmission according to the present patent application when the vehicle is in neutral gear N.

FIG. 7 shows the power transmission route of the vehicles in neutral gear N. The mechanical variable speed components is in the stop working state under the control of the control system of the vehicle, that is, to make the pushing disc 4 to be concentric with the driving disc 5. Meanwhile, the power input shaft 1 drives the pump wheel 6 to rotate through the components of the hydraulic variable speed components, as in the previous embodiment. At this time, both the clutch 13 and the brake 14 are in the stop working state, the sun gear 15 drives the planet gears carriers 16 and the planets to run in the idle running and free state, and the power output shaft 18 of the annular gear is also in the free state, realizing the neutral gear mode of the vehicle.

The speed change of the vehicle is achieved through the mechanical variable speed components and the hydraulic variable speed components, while the forward gear, reverse gear, parking, and neutral gear modes of the vehicle are realized through a group of planet gears, a clutch 13 and a brake 14. This is much simpler than the structure of self-shifting transmission system which is formed by the classics Simpson type of gear train or sacrificial Wen Naoshi's gear train and the fluid torque converter. It has many merits, such as, good start accelerating ability, no need to shift gears under all kind of working conditions during the continuous speed changing, high working efficiency, saving oil, low production cost and so on.

I claim:

1. A mechanical-hydraulic continuously variable speed transmission comprising a housing in which mechanical variable speed components and hydraulic variable speed components installed in turn on a power input shaft;

wherein, the mechanical variable speed components comprising an eccentric mechanism rotating with the power input shaft, a pushing disc installed on the eccentric mechanism rotatablely, a fixing disc arranged on one side of the pushing disc and fixed to the inner side of the housing, a driving disc arranged on other side of the pushing disc and installed on the power input shaft rotatably, and slider components for power transmission positioned between the fixing disc and the pushing disc, and between the pushing disc and the driving disc too; wherein the eccentric mechanism adjusts amount of eccentricity between the pushing disc and the power input shaft according to the load on the driving disc by pushing the pushing disc to work between two extreme eccentric positions, so as to adjust driving torque of the driving disc and transmission rotational speed ratio between the power input shaft and the driving disc;

the hydraulic variable speed components comprising a pump wheel fixed on and rotated with the power input shaft and a turbine fixed on and rotated with the driving disc; wherein transmission medias are filled in space between the pump wheel and the turbine for power transmission, and the turbine is provided with a turbine output shaft extending out of the housing; wherein, adjustment of eccentricity between the pushing disc and the power input shaft turns into change of transmission rotational speed ratio between the power input shaft and a turbine.

2. The mechanical-hydraulic continuously variable speed transmission according to claim 1, wherein, the turbine arranged between the driving disc and the pump wheel, and the turbine is fixed to the driving disc through a shaft sleeve in the turbine.

3. The mechanical-hydraulic continuously variable speed transmission according to claim 2, wherein, there is a guide wheel between the turbine and the pump wheel, and the guide wheel is installed on the shaft sleeve in the turbine by a single direction clutch or bearing.

4. The mechanical-hydraulic continuously variable speed transmission described according to claim 1, wherein, a lock-up clutch between the power input shaft and the turbine output shaft.

5. The mechanical-hydraulic continuously variable speed transmission described according to claim 2, wherein, a lock-up clutch between the power input shaft and the turbine output shaft.

6. The mechanical-hydraulic continuously variable speed transmission described according to claim 3, wherein, a lock-up clutch between the power input shaft and the turbine output shaft.

7. The mechanical-hydraulic continuously variable speed transmission according to claim 4, wherein, the pushing disc is installed on the eccentric mechanism by a bearing, the shaft sleeve in the turbine is installed on the power input shaft by a bearing, and the eccentric mechanism is pushed by hydraulic power;

when the eccentricity of the eccentric mechanism is zero, the driving disc and pushing disc are concentric with the power input shaft; the eccentricity of the eccentric mechanism is produced when the load is acted on the turbine output shaft, and the eccentricity of the pushing disc and the driving disc is produced.

8. The mechanical-hydraulic continuously variable speed transmission according to claim 5, wherein, the pushing disc is installed on the eccentric mechanism by a bearing, the shaft sleeve in the turbine is installed on the power input shaft by a bearing, and the eccentric mechanism is pushed by hydraulic power;

when the eccentricity of the eccentric mechanism is zero, the driving disc and pushing disc are concentric with the power input shaft; the eccentricity of the eccentric mechanism is produced when the load is acted on the turbine output shaft, and the eccentricity of the pushing disc and the driving disc is produced.

9. The mechanical-hydraulic continuously variable speed transmission according to claim 6, wherein, the pushing disc is installed on the eccentric mechanism by a bearing, the shaft sleeve in the turbine is installed on the power input shaft by a bearing, and the eccentric mechanism is pushed by hydraulic power;

when the eccentricity of the eccentric mechanism is zero, the driving disc and pushing disc are concentric with the power input shaft; the eccentricity of the eccentric mechanism is produced when the load is acted on the turbine output shaft, and the eccentricity of the pushing disc and the driving disc is produced.

10. A vehicle mechanical-hydraulic continuously variable speed transmission comprising a power input shaft connected with an engine of the vehicle, a housing in which mechanical variable speed components and hydraulic variable speed components installed in turn on the power input shaft, and gears speed shifting components driven by the hydraulic variable speed components;

wherein, the mechanical variable speed components comprising an eccentric mechanism rotating with the power input shaft, a pushing disc installed on the eccentric mechanism rotatablely, a fixing disc arranged on one side of the pushing disc and fixed to the inner side of the housing, a driving disc arranged on the other side of the pushing disc and installed on the power input shaft rotatablely, and slider components for power transmission positioned between the fixing disc and the pushing disc, and between the pushing disc and the driving disc too; wherein the eccentric mechanism adjusts amount of eccentricity between the pushing disc and the power input shaft according to the load on the driving disc, so as to adjust driving torque of the driving disc and transmission rotational speed ratio between the power input shaft and the driving disc;

the hydraulic variable speed components comprising a pump wheel fixed on and rotated with the power input shaft and a turbine fixed on and rotated with the driving disc; wherein transmission medias are filled in space between the pump wheel and the turbine for power transmission, and the turbine is provided with a turbine output shaft extending out of the housing; wherein, adjustment of eccentricity between the pushing disc and the power input shaft turns into change of transmission rotational speed ratio between the power input shaft and a turbine, the gears speed shifting components comprising a sun gear fixed with the turbine output shaft, planet gears gearing with the sun gear, an annular gear gearing with the planet gears, a planet gears carrier for the planet gears installing on, a clutch arranged on the turbine output shaft outside, as well as a brake installed inside of the housing; the clutch and the brake control the planet gears carrier, and the annular gear has a power output shaft which extending out of the housing.

11. The vehicle mechanical-hydraulic continuously variable speed transmission according to claim 6, wherein, the turbine arranged between the driving disc and the pump wheel, and the turbine is fixed to the driving disc through a shaft sleeve in the turbine.

12. The vehicle mechanical-hydraulic continuously variable speed transmission according to claim 6, wherein, there is a guide wheel between the turbine and the pump wheel, and the guide wheel is installed on the shaft sleeve in the turbine by a single direction clutch or bearing.

13. The vehicle mechanical-hydraulic continuously variable speed transmission according to claim 10, wherein, a lock-up clutch between the power input shaft and the turbine output shaft;
the pushing disc is installed on the eccentric mechanism by a bearing, the shaft sleeve in the turbine is installed on the power input shaft by a bearing, and the eccentric mechanism is pushed by hydraulic power;
when the eccentricity of the eccentric mechanism is zero, the driving disc and pushing disc are concentric with the power input shaft; the eccentricity of the eccentric mechanism is produced when the load is acted on the turbine output shaft, and the eccentricity of the pushing disc and the driving disc is produced.

14. The vehicle mechanical-hydraulic continuously variable speed transmission according to claim 11, wherein, a lock-up clutch between the power input shaft and the turbine output shaft;
the pushing disc is installed on the eccentric mechanism by a bearing, the shaft sleeve in the turbine is installed on the power input shaft by a bearing, and the eccentric mechanism is pushed by hydraulic power;
when the eccentricity of the eccentric mechanism is zero, the driving disc and pushing disc are concentric with the power input shaft; the eccentricity of the eccentric mechanism is produced when the load is acted on the turbine output shaft, and the eccentricity of the pushing disc and the driving disc is produced.

15. The vehicle mechanical-hydraulic continuously variable speed transmission according to claim 12, wherein, a lock-up clutch between the power input shaft and the turbine output shaft;
the pushing disc is installed on the eccentric mechanism by a bearing, the shaft sleeve in the turbine is installed on the power input shaft by a bearing, and the eccentric mechanism is pushed by hydraulic power;
when the eccentricity of the eccentric mechanism is zero, the driving disc and pushing disc are concentric with the power input shaft; the eccentricity of the eccentric mechanism is produced when the load is acted on the turbine output shaft, and the eccentricity of the pushing disc and the driving disc is produced.

16. A method of mechanical-hydraulic continuously variable speed, comprising:
S1: inputting motive powers via a power input shaft, and driving loads via a turbine output shaft;
S2: generating eccentricity which enabling a pushing disc to produce eccentricity by a eccentric mechanism when having low transmission ratio and driving the pushing disc to rotate eccentrically by the power input shaft, then driving a driving disc to rotate through slider components, driving a turbine to rotate through the driving disc and outputting powers via a turbine output shaft, at the same time, rotating a pump wheel of hydraulic variable speed components by the power input shaft, and pushing the turbine to rotate through transmission medias so as to take into assistant action of pushing the turbine output shaft to output powers;
S3: when the rotating speed of the turbine and the rotational speed ratio reaching a certain value, resetting the eccentric mechanism and concentering the pushing disc with the driving disc; at this time, rotating the pump wheel at high speed by the power input shaft, and also pushing the turbine to rotate at a high speed through the transmission medias, and outputting the powers by the turbine output shaft;
S4: increasing the transmission ratio continuously until the pump wheel and the turbine are locked, and obtaining maximum transmission efficiency.

* * * * *